United States Patent
Nimberger

(10) Patent No.: US 8,564,658 B2
(45) Date of Patent: Oct. 22, 2013

(54) NH3 DISTRIBUTOR MONITORING SYSTEM AND METHOD

(75) Inventor: Spencer M. Nimberger, Houston, TX (US)

(73) Assignee: PGI International, Ltd., Houston, TX (US)

( * ) Notice: Subject to any disclaimer, the term of this patent is extended or adjusted under 35 U.S.C. 154(b) by 869 days.

(21) Appl. No.: 12/235,039

(22) Filed: Sep. 22, 2008

(65) Prior Publication Data

US 2010/0073473 A1  Mar. 25, 2010

(51) Int. Cl.
*H04N 5/232* (2006.01)

(52) U.S. Cl.
USPC ............... 348/120; 348/118; 348/119

(58) Field of Classification Search
None
See application file for complete search history.

(56) References Cited

U.S. PATENT DOCUMENTS

| | | | | |
|---|---|---|---|---|
| 3,750,711 A | * | 8/1973 | Conklin et al. | 138/97 |
| 5,477,792 A | * | 12/1995 | Bassett et al. | 111/121 |
| 5,845,592 A | * | 12/1998 | Ridgley | 111/119 |
| 6,047,901 A | * | 4/2000 | Pederson et al. | 239/159 |
| 7,497,069 B2 | * | 3/2009 | Enns et al. | 56/11.9 |
| 2005/0193603 A1 | * | 9/2005 | Schultz et al. | 37/417 |

* cited by examiner

*Primary Examiner* — Firmin Backer
*Assistant Examiner* — Keyvan Emdadi
(74) *Attorney, Agent, or Firm* — Renner, Otto, Boisselle & Sklar, LLP

(57) ABSTRACT

An anhydrous ammonia distribution system includes a portable nurse tank 12 powered by an operator cab 13. One or more distributors 22 receive anhydrous ammonia from the nurse tank, and a plurality of knife hoses 30 deliver anhydrous ammonia from a distributor to a selected number of knives 31 for delivery to the field. Pressure gauge 32, 34 is provided for monitoring pressure at one or more distributors, and a camera 42 positioned within enclosure 40 transmits a reading from the pressure gauge to the operator cab, thereby alerting the operator to a malfunction in the delivery system.

20 Claims, 2 Drawing Sheets

NH3 DISTRIBUTOR MONITORING SYSTEM AND METHOD

FIELD OF THE INVENTION

The present invention relates to systems for dispensing anhydrous ammonia (NH3) into the soil. More particularly, the invention provides an improved technique for monitoring NH3 distribution through the plurality of knife-like hoses and into the soil.

BACKGROUND OF THE INVENTION

Anhydrous ammonia delivery systems are commonly used to place large amounts of nitrogen in the soil. A tractor towed implement known as a tool bar has knives to open the soil, followed by disks to close the soil over the opened knife cut. Anhydrous ammonia (NH3) is placed in the soil by towing a tank of NH3, referred to as a nurse tank, behind the tool bar and flowing the NH3 through a delivery control system mounted on the tool bar to individual hoses attached to each of the knives used to open the soil. The NH3 flows through and is controlled by the delivery control system on the tool bar and into each of the hoses attached behind the tool bar knives. The liquid NH3 is thereby deposited deep in the soil and immediately covered over by the trailing disk. Over time, the nitrogen contained in the liquid NH3 is adsorbed into the soil and made available for the next crop.

An NH3 distribution system typically has three elements. The first is the meter for measuring the NH3 flowing through the delivery control valve. The second is the delivery control valve. The third is the distributor(s) for breaking the large flow line into multiple flow lines which will deliver the NH3 to each knife.

The operating characteristic of a distributor is such that once a travel speed and distribution rate has been established, the pressure at the distributor, known as back pressure, should be a stable value such that clogging of one or more of the knives does not occur. This back pressure is typically monitored with a large gauge attached to the distributor.

When conditions such as soil temperature and moisture content are right for placing NH3 in the soil, it is imperative that the NH3 be distributed as fast as possible due to the size of most farms and the ever changing soil conditions. This leads to delivery systems with very wide tool bars with many knives. Depending on the desired delivery rate and the width of the tool bar, multiple distributors may be used for a single delivery control system or multiple delivery control systems having one or more distributors may be used. When the NH3 delivery application is in process, the back pressure at all of the distributors should be relatively equal providing there is no blockage at one or more of the delivery hoses. It would be desirable to monitor all of the backpressures simultaneously to detect system malfunction and/or delivery hose clogging which could lead to a serious uneven distribution of NH3 to the field. In the case of multiple or in some cases single distributors, monitoring the back pressure is difficult if not impossible due to the distance of the gauges from the operator in the cab, which can be as much as 40 feet, not to mention the difficulty with the operator driving and turning around repeatedly to try and monitor back pressures at the tool bar.

The disadvantages of the prior art are overcome by the present invention, and an improved NH3 distributor back pressure monitoring system and method are hereinafter disclosed.

SUMMARY OF THE INVENTION

In one embodiment, an anhydrous ammonia distributor back pressure monitoring system includes a portable nurse tank powered by an operator cab, and one or more distributors each for receiving anhydrous ammonia from the nurse tank and delivering anhydrous ammonia to a selected number of knives for delivery to the field. The system includes a pressure gauge for monitoring back pressure at a distributor, and a camera for transmitting a reading from the pressure gauge to the operator cab, thereby alerting the operator of a malfunction in the delivery system.

According to the method of the invention, a portable tank is powered by an operator cab while anhydrous ammonia is transmitted from the tank to one or more distributors, which deliver anhydrous ammonia from a distributor to a selected number of knives for delivery to the field. According to one embodiment of the method, back pressure at the distributor is monitored, and a camera reading from a back pressure gauge is transmitted to a monitor in the operator cab, thereby alerting the operator to malfunction in the delivery system.

These and further features and advantages of the present invention will become apparent from the following detailed description, wherein reference is made to the figures in the accompanying drawings.

DESCRIPTION OF THE PREFERRED EMBODIMENTS

Figure 1:
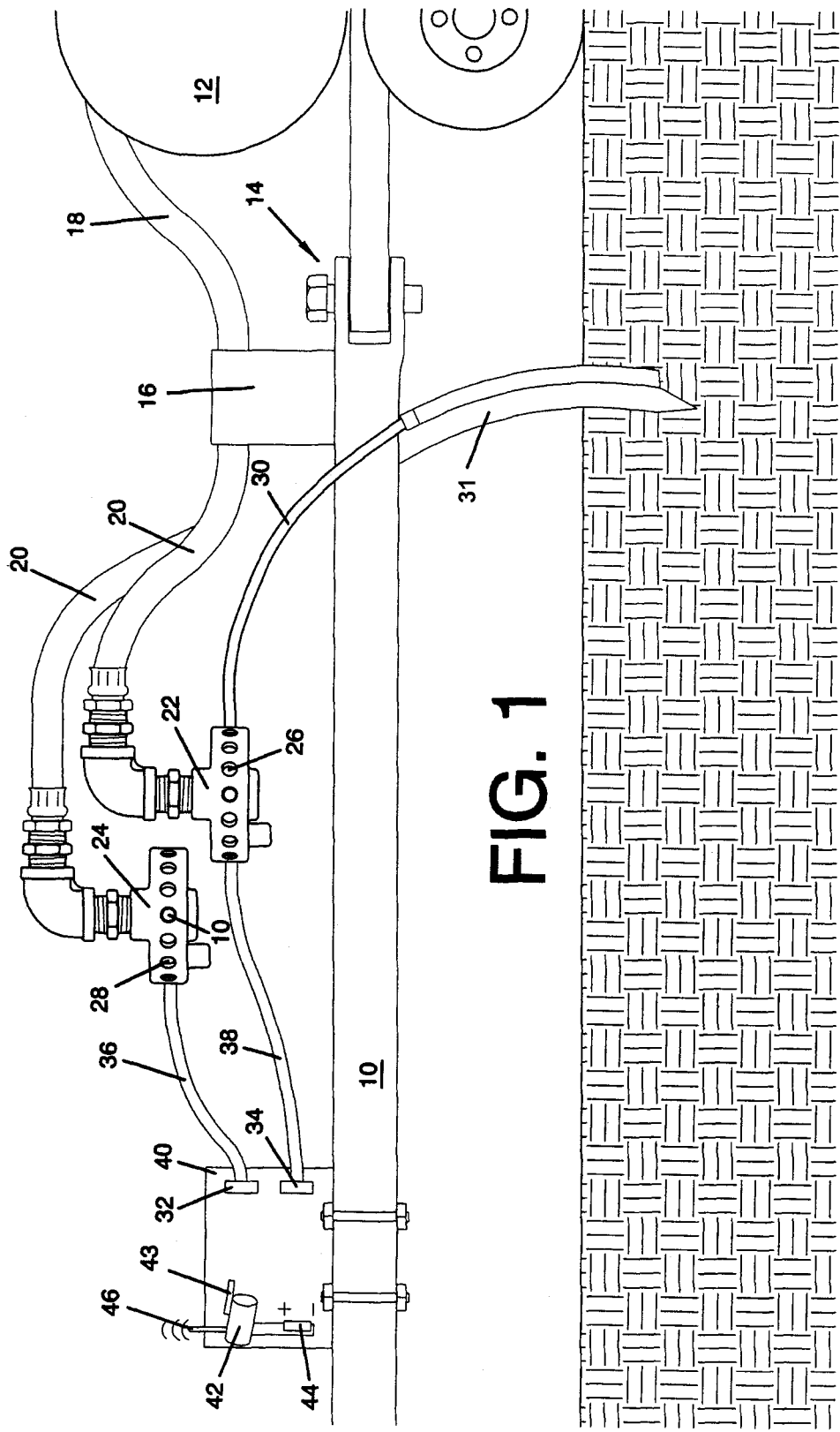
FIG. 1 is a side view of a portion of the distributor back pressure monitoring system according to the present invention.

FIG. 1 shows a tool bar 10 which is pulled by a tractor or operator cab 10. A nurse tank 12 containing the NH3 supply is attached to the tool bar at hitch point 14. The NH3 delivery system is composed of nurse tank 12 which flows product to delivery control system 16 through delivery hose 18. Product exits the delivery control system 16 through hose 20 which delivers product to one or more distributors 22 and 24. Product then flows out multiple ports 26 and 28 on each distributor through knife hoses 30 into the soil behind each knife 31 as the implements are pulled through the field by the tractor. Only one knife 31 and one hose 30 are shown in FIG. 1 for clarity.

The pressure in each distributor 22 and 24 is monitored by pressure gages 32 and 34 fluidly attached to the distributors by pressure hoses 36 and 38. It should be understood that, depending on the width of the tool bar, there may be from one to five or six distributors in the system, with each distributor having hose 30 attachments to from six to thirteen knives 32.

As shown in FIG. 1, the pressure gages 32 and 34 are mounted in a weather tight enclosure 40 so as to be visible to camera 42 which contains small LED lights to provide illumination inside the enclosure 40. In some applications, more than one enclosure for the plurality of pressure gauges and cameras may be provided. Camera 42 is operated by battery 44 and transmits its video signal through antenna 46. Camera 42 may include LED lights 43 for illumination.

Figure 2:
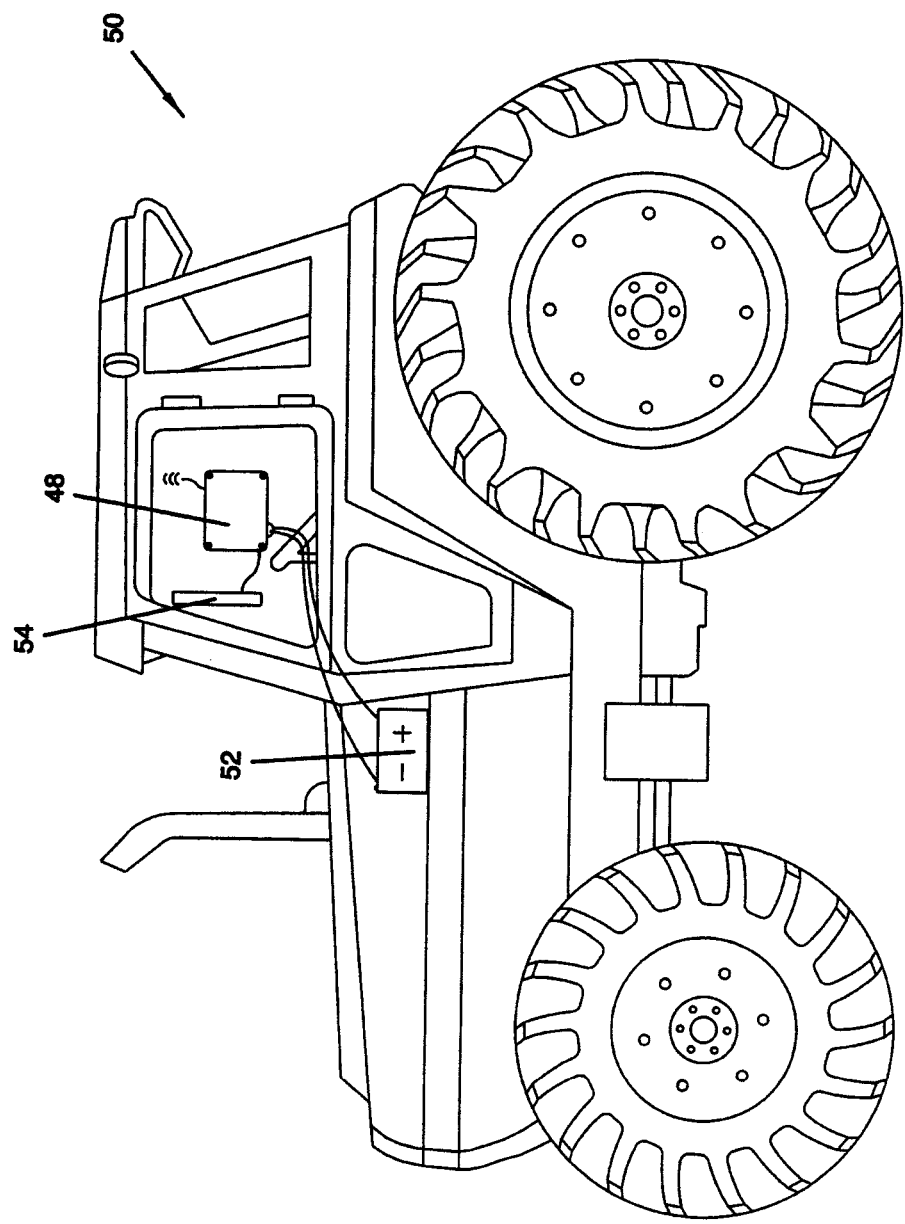
FIG. 2 is a side view of a suitable operator cab.

The video signal from camera 42 is received by receiver 48 (see FIG. 2) mounted in the cab of tractor 50 and powered by the tractor battery 52. The received signal is conveyed to an attached monitor 54 which is placed in convenient viewing sight of the tractor operator. In this fashion, the back pressure from one or more distributors in an NH3 delivery system can be continuously monitored for the occurrence of knife hose blockage. When the pressures deviate from normal, the tool bar 10 and the knives 31 supported thereon may be removed from the soil and NH3 may be flowed through the system to clear the blockage and then normal distribution resumed. In other embodiments, the camera may transmit still pictures on a regular basis to the operator cab, e.g., every 5 seconds.

A comparatively low cost camera may be used to send visual signals of the readout from the pressure gauge, with the camera provided with its own battery and lighting source, all contained within a weather tight enclosure. An analogue pressure gauge is suitable for many applications, although a pressure gauge with a digital readout alternatively could be used, with a camera then sending pictures of the digital readout to the screen in the operator cab. The system of the present invention may thus be provided as a kit, with the camera, battery, and light source to be mounted within an enclosure, which also preferably houses the pressure gauge. The pressure gauge can effectively monitor the back pressure at the distributor, since readily available hoses may be used to fluidly connect a distributor with a respective back pressure gauge.

The camera disclosed herein may use wireless technology, e.g., radio technology, to transfer signals from the camera to a monitor, which is positioned on the operator cab such that the monitor is visible to an operator within the operator cab. Various types of wireless transmission systems may be used to transfer signals from the camera to a monitor. In another embodiment, the camera could be hardwired to the monitor, so that wireless technology was not utilized to transmit information to the operator. If a hardwired monitoring system is used, the camera may be powered by a battery positioned on the operator cab or tractor, rather than providing a separate battery in the enclosure.

Although the back pressure gauges and the camera disclosed herein may be conveniently supported on a tool bar, the gauges and camera may be positioned at any desired location on the equipment on the exterior of the operator cab. As noted earlier, anhydrous ammonia is not transmitted into the interior of the operator cab for safety reasons.

Placing pressure transducers in each of the distributors and relaying that information to a display in the tractor cab would be a costly solution. A lower cost solution would run pressure hoses to gauges inside the cab, so the operator can monitor backpressure while looking forward and driving. Due to the hazard that a leaking NH3 pressure hose or gauge inside the cab would present to the driver, this type of solution is rejected for safety reasons. A need exists for a low cost, safe device where the driver in the tractor cab can view the one or multiple backpressure gauges on the distributor(s) on the tool bar. Ideally, the solution would allow, where multiple distributors are used, simultaneous viewing of multiple pressure gauges for comparison since the backpressure should be equal in all of the distributors in the absence of hose blockage.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. An anhydrous ammonia distributor back pressure monitoring system for delivering liquid anhydrous ammonia to a field via an operator cab, including a portable tank powered by the operator cab for holding liquid anhydrous ammonia, one or more distributors each for receiving liquid anhydrous ammonia from the tank, and a plurality of knife hoses for delivering liquid anhydrous ammonia from a distributor to a plurality of knives for delivery to the field, the system further comprising:
   a pressure gauge for monitoring liquid pressure of the anhydrous ammonia at the distributor to determine if flow to the plurality of knives is restricted;
   a monitor visible to an operator in the operator cab; and
   a camera for transmitting a reading from the pressure gauge to the monitor, thereby alerting the operator of a malfunction in the delivery system.

2. An anhydrous ammonia distributor back pressure monitoring system as defined in claim 1, further comprising:
   a weather-tight enclosure for mounting on a tool bar for housing a respective pressure gauge and the camera; and
   a pressure hose for transmitting a pressure signal from the distributor to the pressure gauge.

3. An anhydrous ammonia distributor back pressure monitoring system as defined in claim 1, wherein the camera transmits a continuous video of pressure gauge reading to the monitor, which is mounted on the operator cab.

4. An anhydrous ammonia distributor back pressure monitoring system as defined in claim 2, wherein the camera is powered by a battery positioned within the enclosure.

5. An anhydrous ammonia distributor back pressure monitoring system as defined in claim 4, wherein the camera contains one or more LED lights to provide illumination.

6. An anhydrous ammonia distributor back pressure monitoring system as defined in claim 1, wherein the portable tank supplies liquid anhydrous ammonia to a plurality of distributors.

7. An anhydrous ammonia distributor back pressure monitoring system as defined in claim 6, wherein each of the plurality of distributors are supported on a tool bar which is raised to remove blockage to the plurality of knives.

8. An anhydrous ammonia distributor back pressure monitoring system as defined in claim 1, wherein a camera is powered by a battery supported on the operator cab.

9. An anhydrous ammonia distributor back pressure monitoring system for delivering liquid anhydrous ammonia to a field via an operator cab, including a portable tank powered by the operator cab for holding liquid anhydrous ammonia, a plurality of distributors each supported on a tool bar for receiving liquid anhydrous ammonia from the nurse tank, and a plurality of knife hoses for delivering liquid anhydrous ammonia from each of the plurality of distributors to a plurality of knives for delivery to the field, the system further comprising:
   a plurality of pressure gauges each for monitoring liquid pressure of the anhydrous ammonia at a respective distributor;
   a weather-tight enclosure for housing the plurality of pressure gauges;
   a monitor visible to an operator in the operator cab; and
   a camera for transmitting a reading from the plurality of pressure gauges to the monitor, thereby alerting the operator of a malfunction in the delivery system.

10. An anhydrous ammonia distributor back pressure monitoring system as defined in claim 9, further comprising:
   a plurality of pressure hoses for transmitting a liquid pressure signal from the plurality of distributors to a respective pressure gauge.

11. An anhydrous ammonia distributor back pressure monitoring system as defined in claim 9, wherein the camera transmits a continuous video of pressure gauge readings to the monitor, which is mounted on the operator cab.

12. An anhydrous ammonia distributor back pressure monitoring system as defined in claim 11, wherein the camera is powered by a battery positioned within the enclosure.

13. An anhydrous ammonia distributor back pressure monitoring system as defined in claim 12, wherein the camera contains one or more LED lights to provide illumination.

14. A method of monitoring anhydrous ammonia back pressure at a distributor, including powering a portable tank by an operator cab for holding liquid anhydrous ammonia, transporting liquid anhydrous ammonia from the portable tank to one or more distributors, and delivering liquid anhydrous ammonia from a distributor to a plurality of knives for delivery to the field, the method further comprising:
- sensing liquid pressure of anhydrous ammonia at the distributor with a pressure gauge;
- positioning a monitor visible to an operator in the operator cab; and
- transmitting a camera reading from the pressure gauge to the monitor, thereby alerting the operator of a malfunction in the delivery system.

15. A method as defined in claim 14, further comprising:
- mounting a weather-tight enclosure on the tool bar for housing a respective pressure gauge; and
- transmitting a liquid pressure signal from a distributor to a respective pressure gauge via a hose.

16. A method as defined in claim 14, wherein the camera transmits a video of pressure gauge readings to a monitor mounted in the tractor cab.

17. A method as defined in claim 16, wherein the camera is powered by a battery positioned on the operator cab.

18. A method as defined in claim 17, wherein the camera contains one or more LED lights to provide illumination.

19. A method as defined in claim 14, wherein the nurse tank supplies anhydrous ammonia to a plurality of distributors.

20. A method as defined in claim 19, wherein each of the plurality of distributors are supported on a tool bar which is raised to remove blockage to the plurality of knives.

* * * * *